(12) United States Patent
Nikitenko

(10) Patent No.: US 10,906,654 B2
(45) Date of Patent: Feb. 2, 2021

(54) PARACHUTE LANDING ASSISTANT

(71) Applicant: PLAKO LLC, Tucson, AZ (US)

(72) Inventor: Patrick Lee Nikitenko, Tucson, AZ (US)

(73) Assignee: PLAKO LLC, Tucson, AZ (US)

(*) Notice: Subject to any disclaimer, the term of this patent is extended or adjusted under 35 U.S.C. 154(b) by 0 days.

(21) Appl. No.: 16/667,826

(22) Filed: Oct. 29, 2019

(65) Prior Publication Data
US 2020/0122845 A1    Apr. 23, 2020

Related U.S. Application Data

(63) Continuation-in-part of application No. 15/908,691, filed on Feb. 28, 2018, now Pat. No. 10,457,416.

(60) Provisional application No. 62/465,711, filed on Mar. 1, 2017.

(51) Int. Cl.
| | |
|---|---|
| G08B 21/00 | (2006.01) |
| B64D 17/40 | (2006.01) |
| G08B 21/02 | (2006.01) |
| G01S 17/93 | (2020.01) |

(52) U.S. Cl.
CPC ............ B64D 17/40 (2013.01); G01S 17/93 (2013.01); G08B 21/02 (2013.01)

(58) Field of Classification Search
CPC ..... G01S 17/74; A42B 3/0433; A42B 3/0453; B64D 47/00; B64D 47/02; B64D 17/00; B64D 45/04; B64D 23/00; G08B 21/02
See application file for complete search history.

(56) References Cited

U.S. PATENT DOCUMENTS

| | | | |
|---|---|---|---|
| 5,622,337 A * | 4/1997 | Unruh | B64D 23/00 244/142 |
| 9,175,837 B1* | 11/2015 | Leegate | A42B 3/0433 |
| 9,522,743 B1* | 12/2016 | Tolani | B64D 47/00 |
| 9,630,727 B1* | 4/2017 | Leegate | B64D 17/00 |
| 9,746,561 B2* | 8/2017 | Leegate | G01S 17/74 |
| 9,784,887 B1* | 10/2017 | Ulmer | G01S 17/95 |
| 10,232,938 B2* | 3/2019 | Yates | B64C 39/024 |
| 2004/0119816 A1* | 6/2004 | Swain | A42B 3/042 348/61 |
| 2016/0150360 A1* | 5/2016 | Pope | H04W 4/029 340/8.1 |
| 2017/0067747 A1* | 3/2017 | Ricci | G06F 16/183 |

* cited by examiner

*Primary Examiner* — Toan N Pham
(74) *Attorney, Agent, or Firm* — Martin S. High, P.C.

(57) ABSTRACT

The embodiments of the Parachute Landing Assistant are comprised of a battery pack, a power switch, an LED indicator light; an audio jack; a microcontroller; and a ground proximity sensor. The LED indicator light informs the parachutist as to whether operation is enabled or disabled and indicates when the unit is charging. The microcontroller controls the components of the Parachute Landing Assistant. The ground proximity sensor senses the distance from the ground of the parachutist. The ambient pressure sensor allows the unit to determine its height. During a jump the ambient pressure gauge will sense the pressure change and turn on the Parachute Landing Assistant. It will also be used to send a warning to advise the parachutist of upcoming flare tones established by the ground proximity sensor and microcontroller.

7 Claims, 16 Drawing Sheets

PARACHUTE LANDING ASSISTANT

STATEMENT REGARDING FEDERALLY SPONSORED RESEARCH OR DEVELOPMENT

Not applicable

FIELD OF THE EMBODIMENTS

The field of the embodiments is parachuting equipment. More specifically, the field of the embodiments is ground proximity warning devices.

BACKGROUND OF THE EMBODIMENTS

When parachutists approach the ground for a landing, they begin a flare technique to slow the parachute. In both manned and unmanned parachute systems to include cargo delivery, and general aviation aircraft, significant injury and equipment damage occur due to improper procedures during the landing phase of the parachute and aircraft flight. In 2015, 41 fatalities were reported associated with parachuting worldwide. Many of those injuries were due to a hard landing. See http://www.dropzone.com/fatalities/ (last accessed Feb. 22, 2017). For example, an experienced solo skydiver died due to a hard landing at Dillingham Airfield in Hawaii on Oct. 22, 2016. See http://khon2.com/2016/10/22/skydiver-injured-in-landing-at-dillingham-air-field/ (last accessed Feb. 22, 2017). Military parachutists are particularly subject to hard landings during nighttime jumps. Two key elements to performing a safe landing are accurate knowledge of the parachutist's distance to the ground and the timing of the flare technique at the proper altitude. This same information is required to properly land an aircraft or an unmanned cargo parachute load.

The most common parachute altimeters, which are sometimes called mechanical altimeters, depend on the status pressure of the ambient air. As the parachutist descends, the ambient pressure increases. Once the ambient pressure reaches a predetermined level, the altimeter alerts to the proximity with the ground. The major problem with altimeters based on ambient pressure is that they are inherently inaccurate to +/−30 feet which is more than the entire flaring sequence. Altimeters also depend on calibration to the local elevation. Therefore, the altimeter is not used to determine the flare height. The parachutist is strictly using a visual gauge learned by experience. Further, most of these altimeters are placed on the wrist of the parachutist. The parachute flare at this point in the jump requires split second decision making of the parachutist. At the point where the parachutist is required to flare the parachute for a landing, the user cannot spare valuable time to glance at the wrist mounted altimeter. Another technology employed is using GPS to determine the altitude of the ground at the location of the parachutist. Unfortunately, there is a lag time in using all GPS devices that makes their use too inaccurate for parachute landings. Considering that the entire flaring process must happen within approximately 1.5 seconds at 18 feet per second decent rate, any kind of delays or inaccuracies could cause injury. In aviation anything above a 6.6 ft per second vertical decent rate is considered a hard landing.

The purpose of the embodiments described herein is to provide an accurate and reliable device to determine altitude, distance and velocity to the ground for recreational and military parachutists, unmanned cargo delivery systems and general aviation.

SUMMARY OF THE EMBODIMENTS

The embodiments of the Parachute Landing Assistant are comprised of a battery pack, a power switch or button, system indicator device, volume control, wireless digital communication module or USB port or both a wireless digital communication module and USB port, an audio jack, overt speaker, real time clock chip, a microcontroller, a ground proximity sensor or sensors, and an ambient pressure sensor. The battery pack is comprised of a power storage means such as alkaline, lithium ion, rechargeable or non-rechargeable or other types of battery system. The power source control allows the parachutist to enable or disable the operation of Parachute Landing Assistant. The indicator devices inform the parachutist or pilot as to whether the Parachute Landing Assistant operation is enabled or disabled. The volume control allows the parachutist to set the appropriate volume. The USB port and or wireless digital communication module allow the parachutist or pilot to program settings that control the overall device and to download stored files onto a micro SD memory card ("micro SD") connector card of previous jumps. The audio jack is comprised of a standard ¼", ⅛", or 3/32" mono audio or stereo audio receptacle or wireless digital communication module that accepts the analogous audio plug or voice modulation. The real time clock chip time stamps all files saved on the micro SD card for the parachutist's viewing. The microcontroller controls all the other components of the Parachute Landing Assistant. The ground proximity sensor or sensors senses the distance from the ground to the parachutist. The ground proximity sensor can be LIDAR, LADAR, Acoustic, Barometric Pressure, GPS, Radar, IR, Laser, Ultrasonic and Sonar. It could be a single sensor or a combined effort of multiple sensors for an all-weather capability. The ambient pressure sensor allows the Parachute Landing Assistant to know where the Parachute Landing Assistant is during the skydive. Once the ambient pressure gauge has determined the parachutist has begun the decent from the jump plane, the ambient pressure gauge will sense the pressure change and automatically bring the Parachute Landing Assistant out of the low battery consumption mode. The ambient pressure sensor will also put the Parachute Landing Assistant in a low battery consumption mode if the parachutist forgets to turn the Parachute Landing Assistant off. The ambient pressure sensor will also be used to send a warning to advise the parachutist of upcoming flare tones or voice commands established by the ground proximity sensor. The Parachute Landing Assistant will also have imbedded algorithms that will auto adjust canopy flare points based on changes in decent rate due to changing atmospheric weather conditions or parachutist inputs.

There has thus been outlined, rather broadly, the more important features of the embodiments of the Parachute Landing Assistant in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
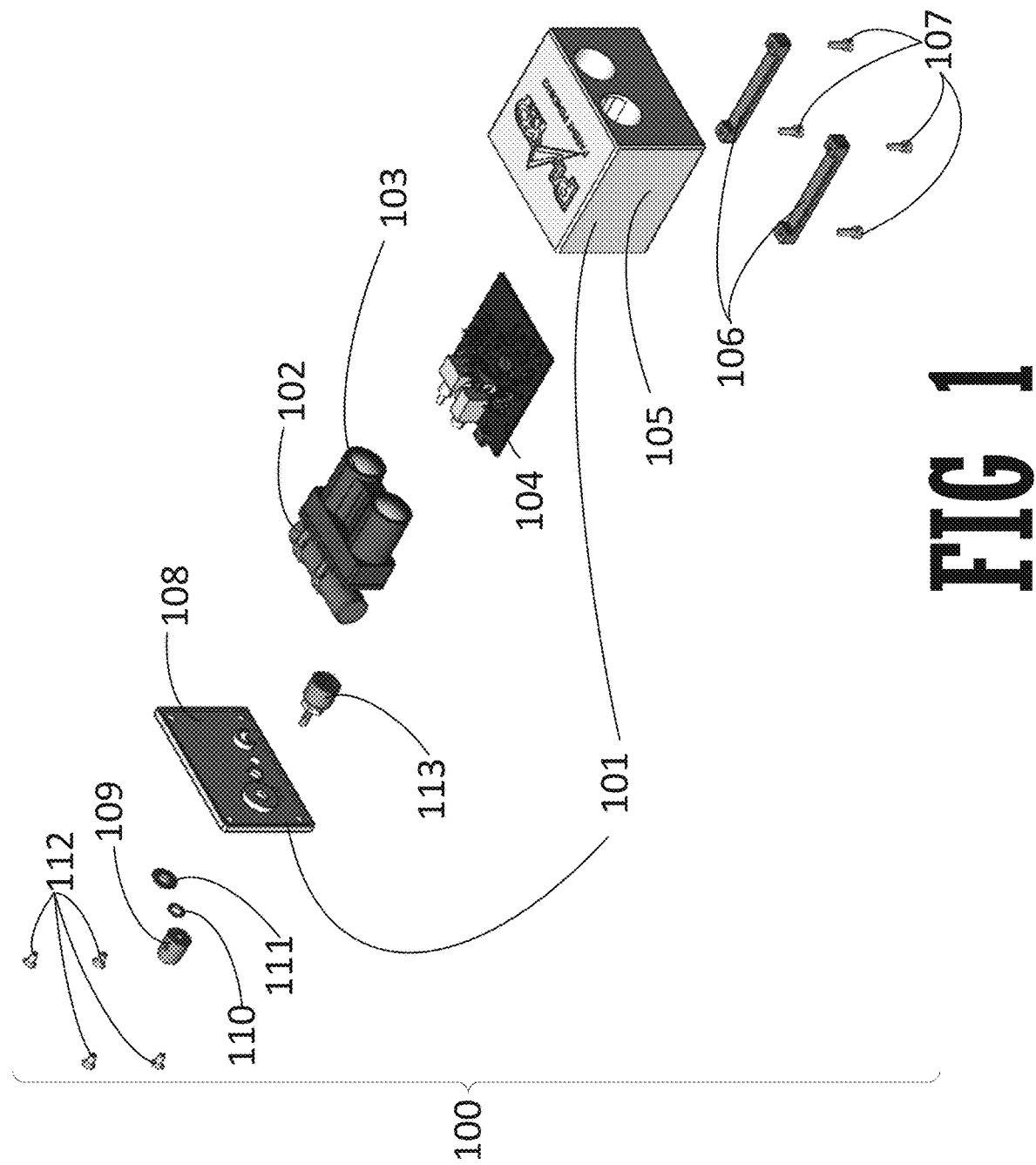
FIG. 1 is a schematic exploded view of an embodiment of the Parachute Landing Assistant.
Figure 2:
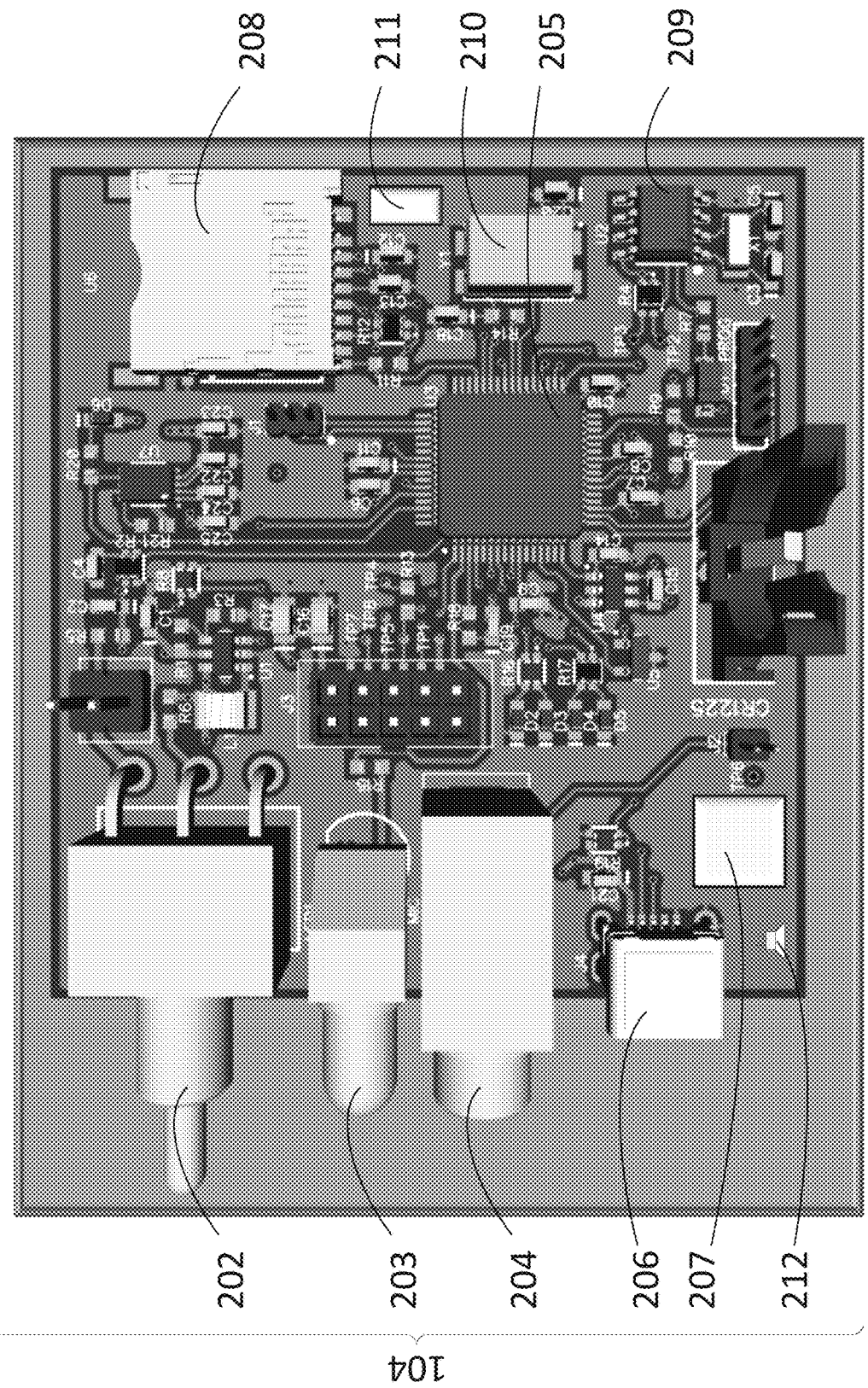
FIG. 2 is a schematic view of the layout of an embodiment of the Parachute Landing Assistant printed wire board (PWB).
Figure 3:
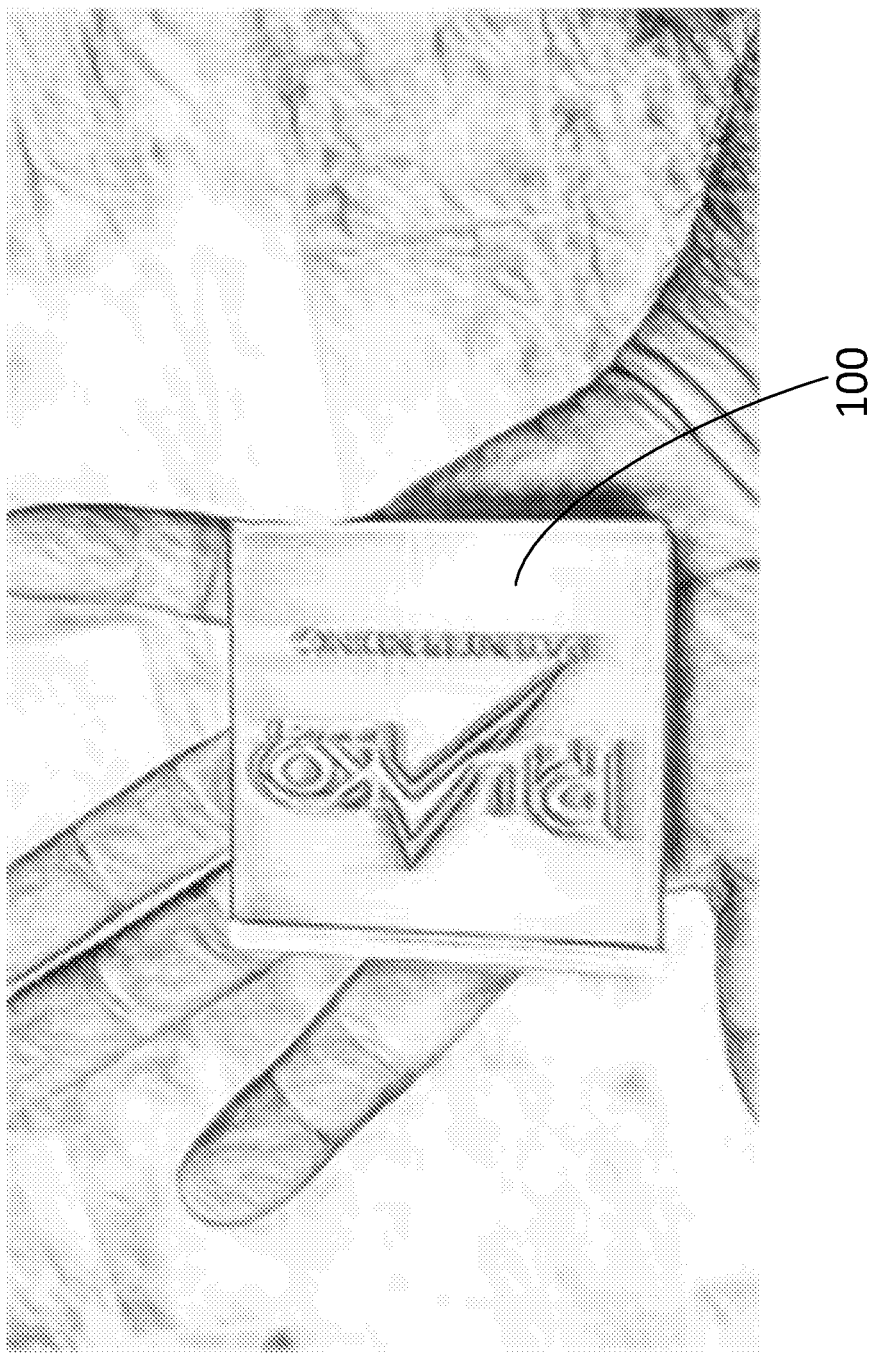
FIG. 3 is a top view of an embodiment of the Parachute Landing Assistant.
Figure 4:
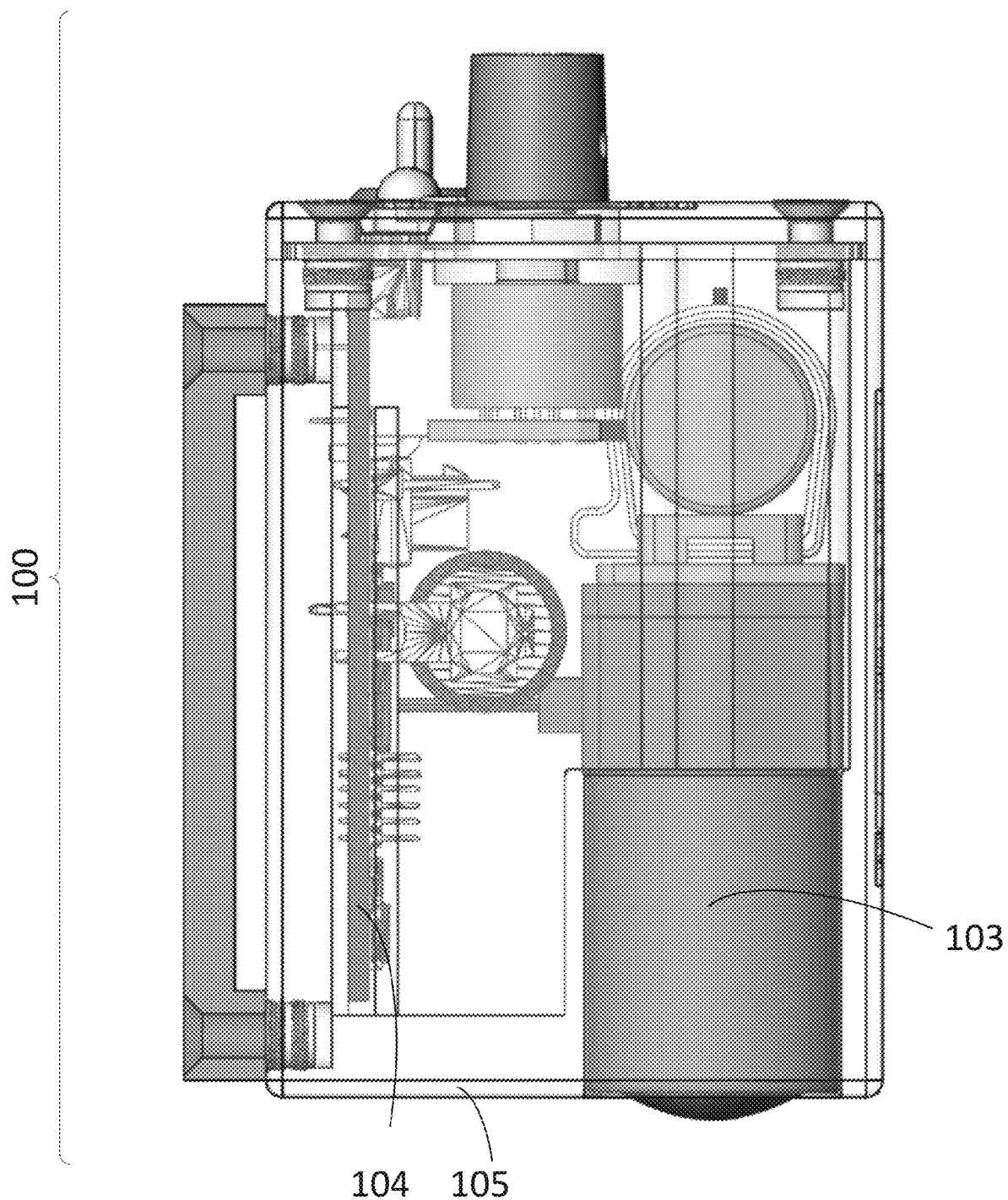
FIG. 4 is a side view of an embodiment of the Parachute Landing Assistant.
Figure 5:
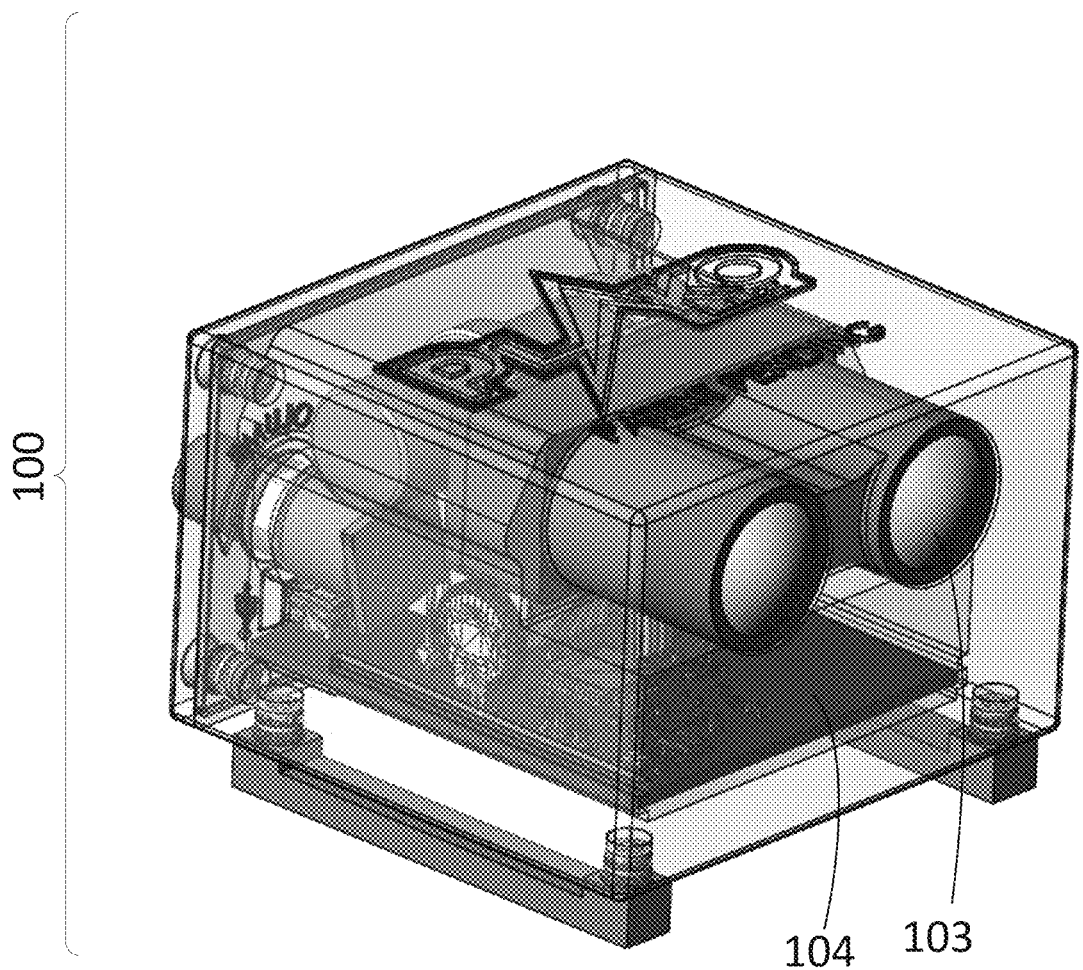
FIG. 5 is a perspective schematic view of an embodiment of the Parachute Landing Assistant.
Figure 6:
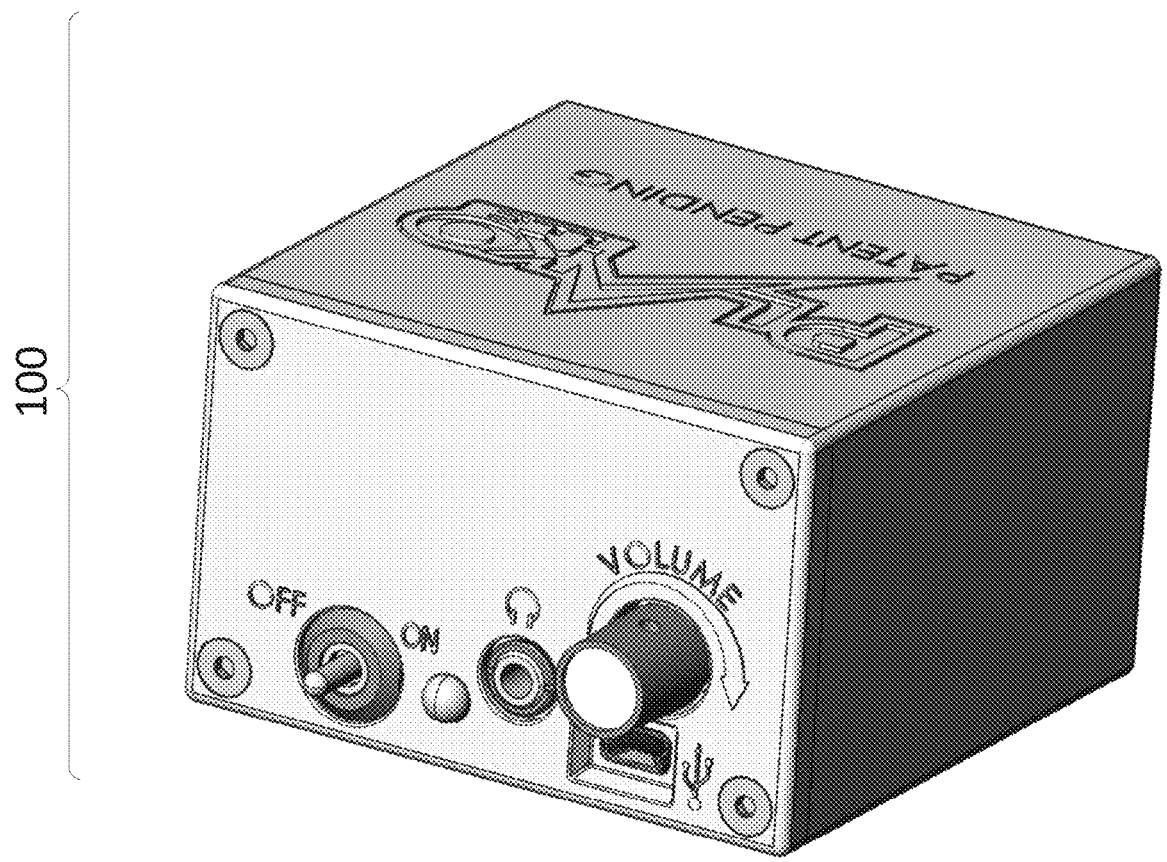
FIG. 6 is a front view of an embodiment of the Parachute Landing Assistant.
Figure 7:
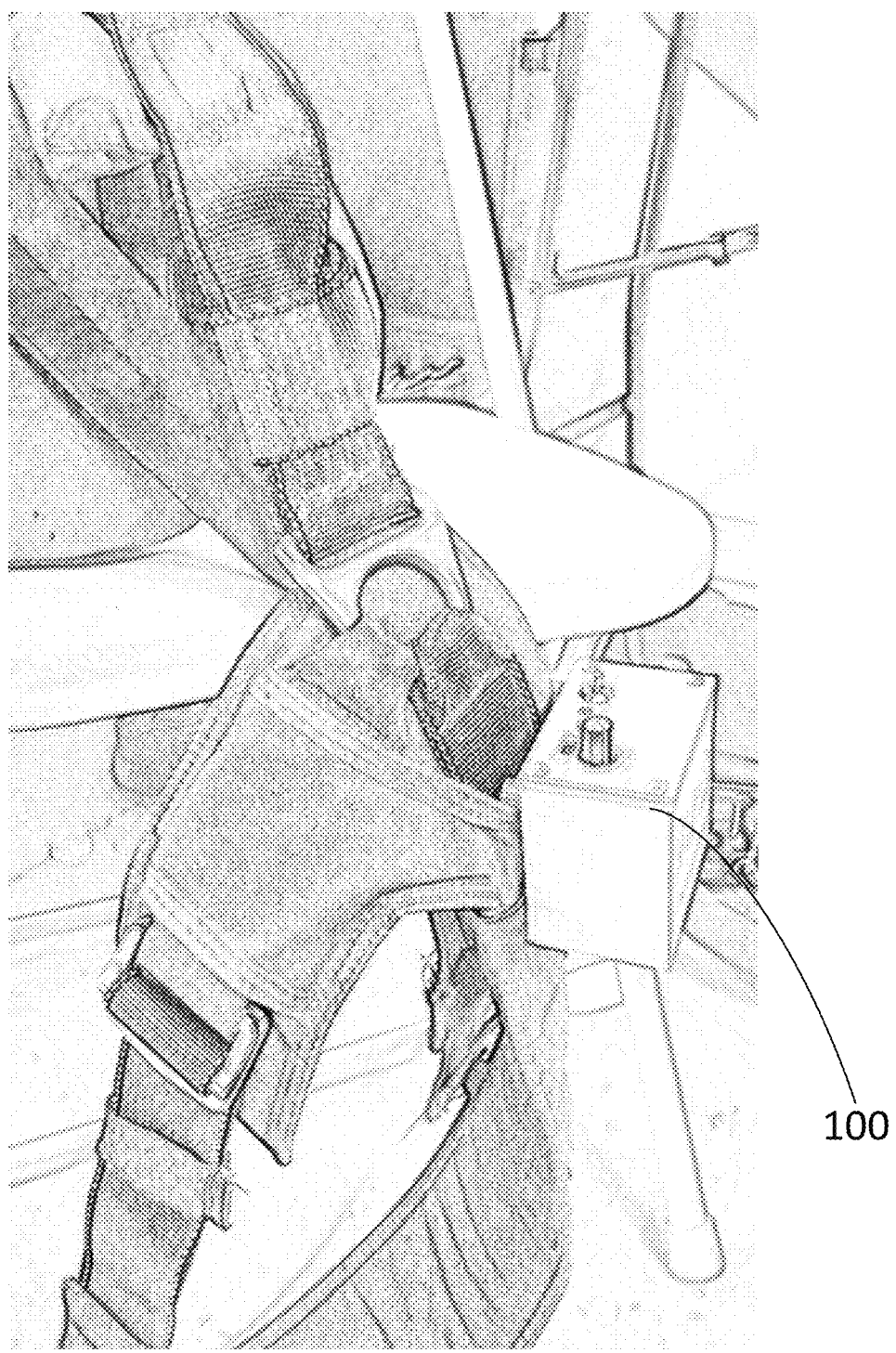
FIG. 7 is a schematic view of an embodiment of the Parachute Landing Assistant attached to the parachute straps of a user.
Figure 8:
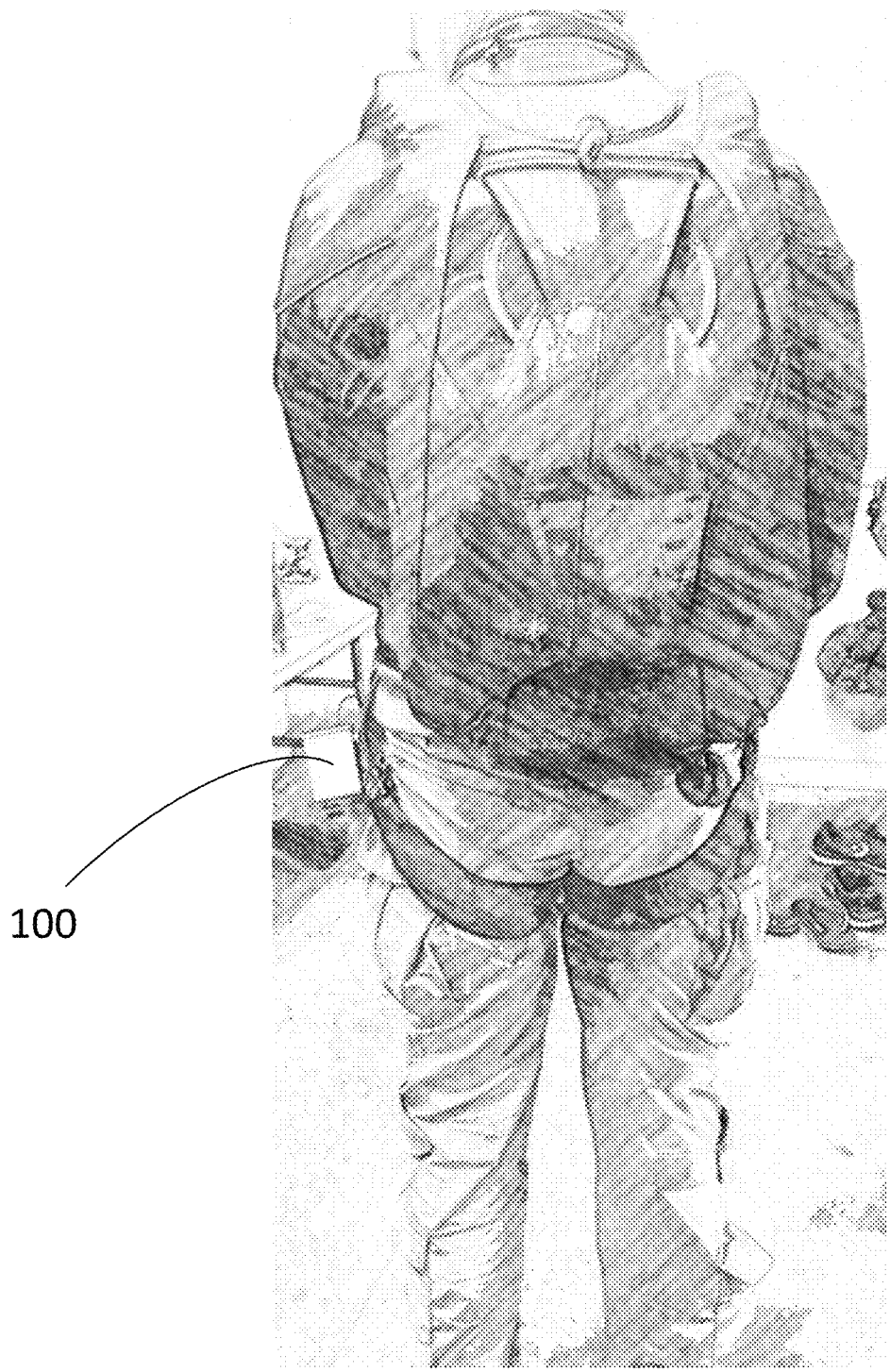
FIG. 8 is a schematic view of an embodiment of the Parachute Landing Assistant attached to the let strap belt of a user harness.
Figure 9:
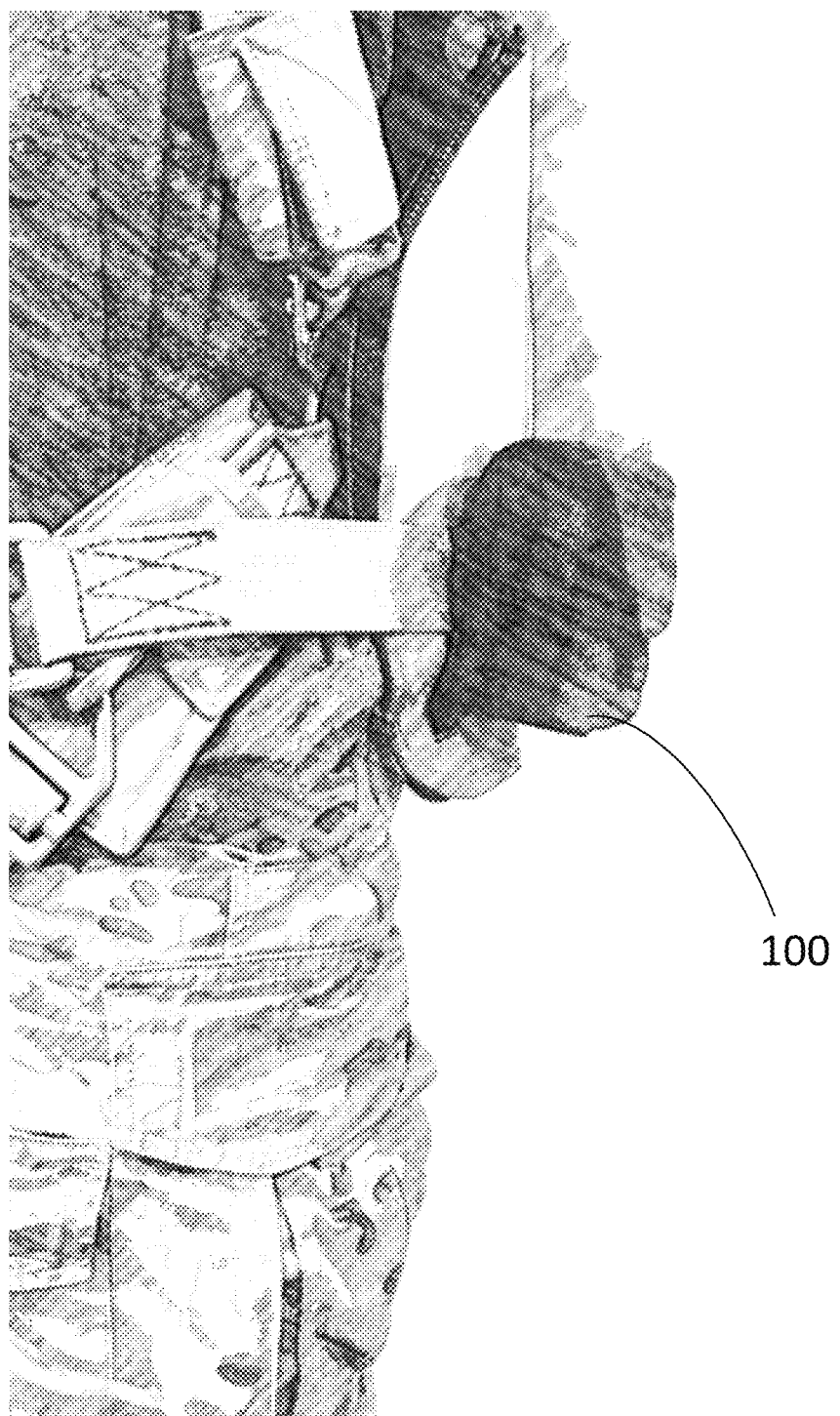
FIG. 9 is a schematic view of an embodiment of the Parachute Landing Assistant in a pouch attached to the parachute straps of a user.
Figure 10:
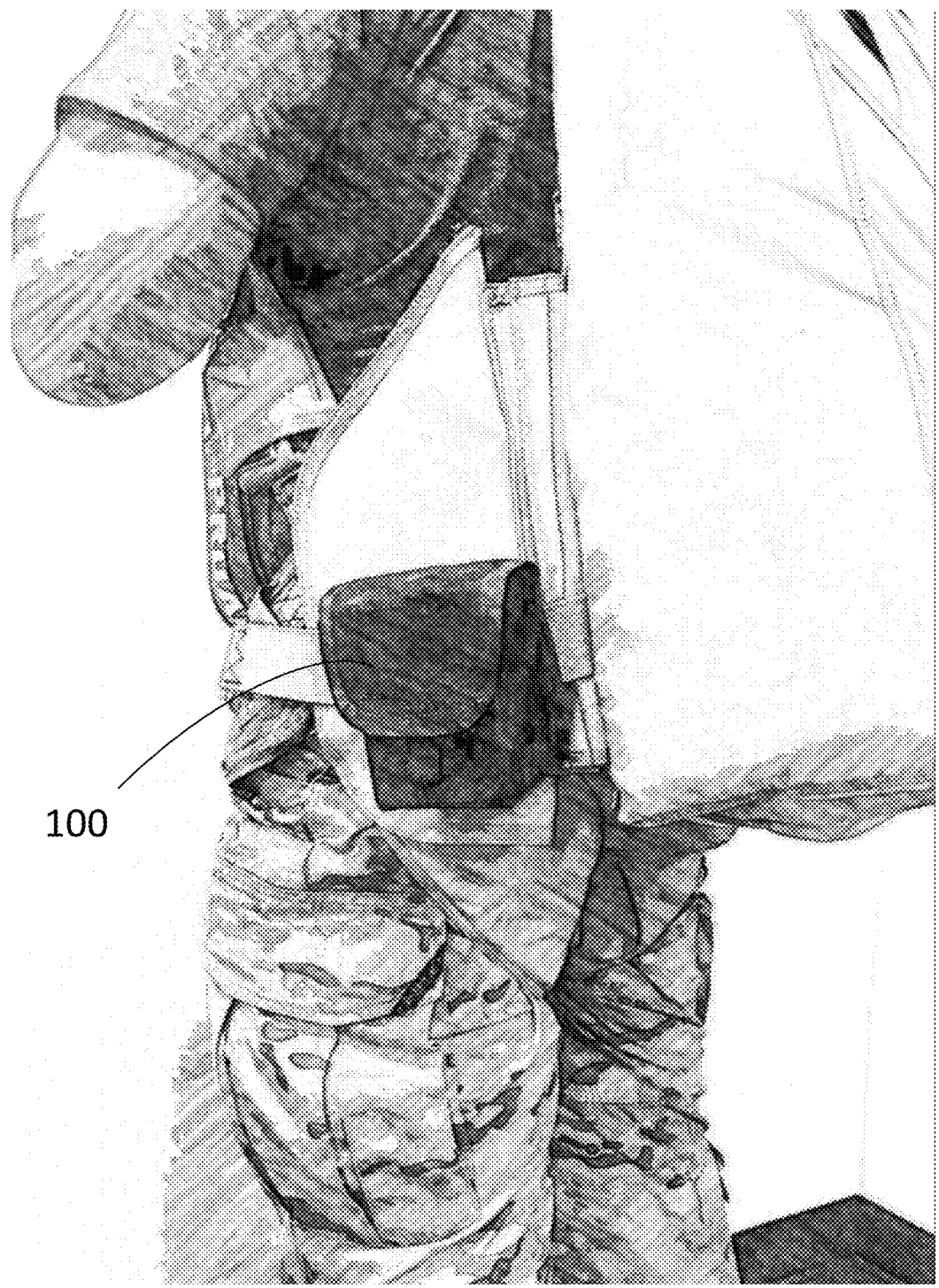
FIG. 10 is a schematic view of an embodiment of the Parachute Landing Assistant in a pouch attached to the parachute straps of a user.
Figure 11:
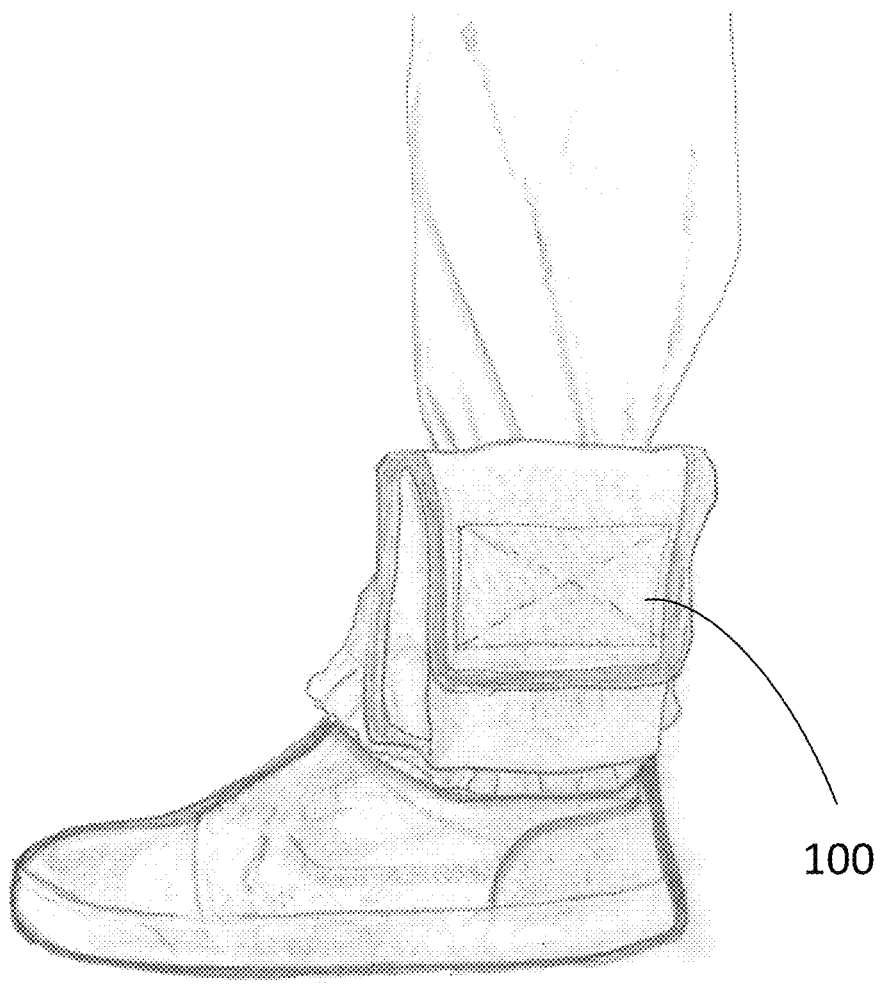
FIG. 11 is a schematic view of an embodiment of the Parachute Landing Assistant in a pouch attached to the ankle of a user.
Figure 12:
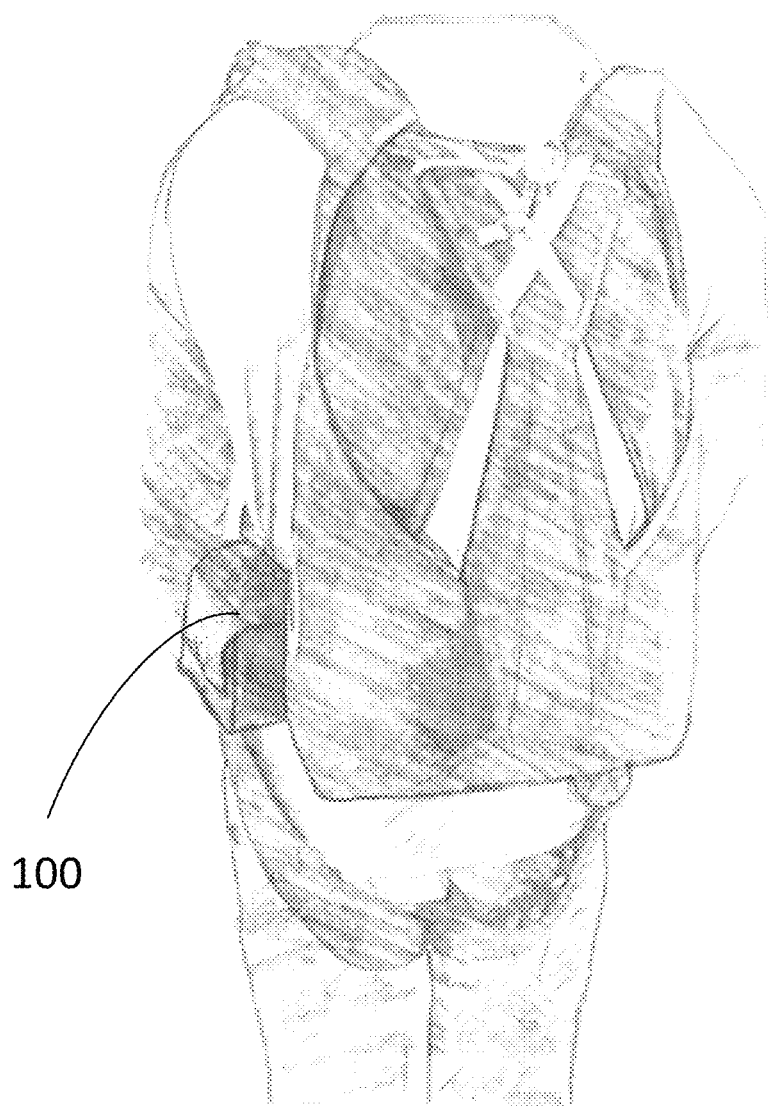
FIG. 12 is a schematic view of an embodiment of the Parachute Landing Assistant in a pouch attached to the harness belt of a user.
Figure 13:
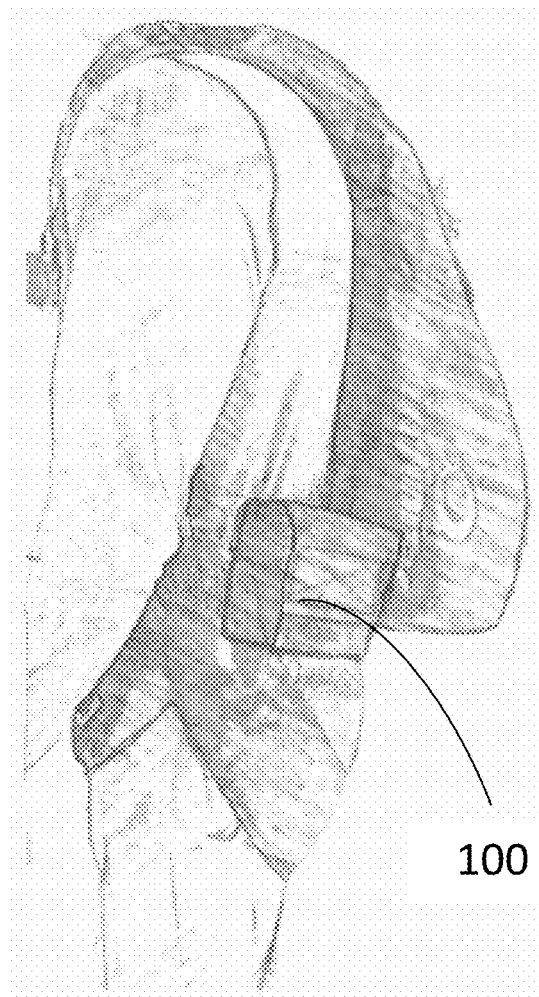
FIG. 13 is a schematic view of an embodiment of the Parachute Landing Assistant in a pouch attached to the parachute harness straps of a user.
Figure 14:
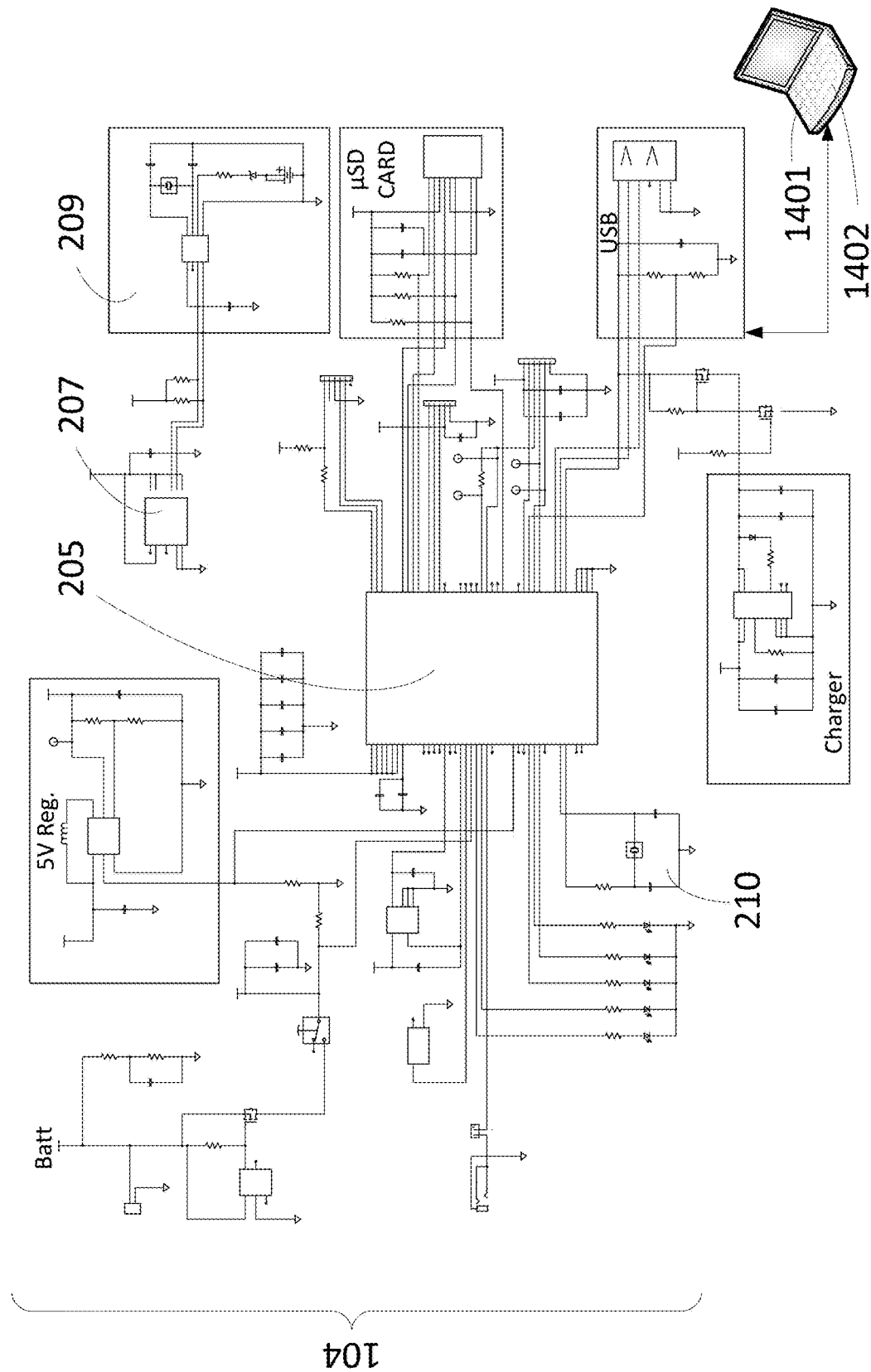
FIG. 14 is an electrical schematic of an embodiment of the Parachute Landing Assistant.
Figure 15:
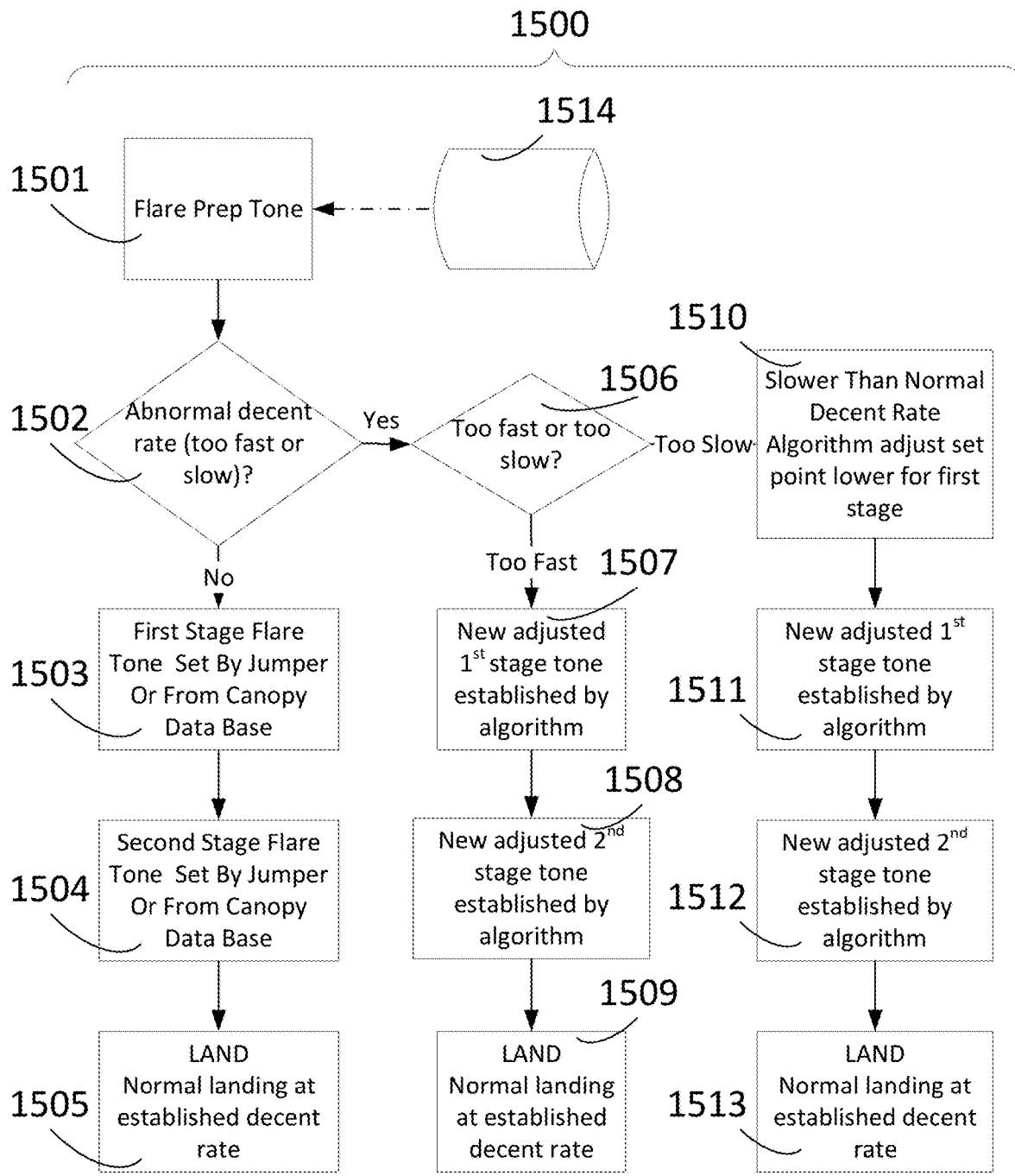
FIG. 15 is a schematic flow diagram of an embodiment the flare height algorithm.
Figure 16:
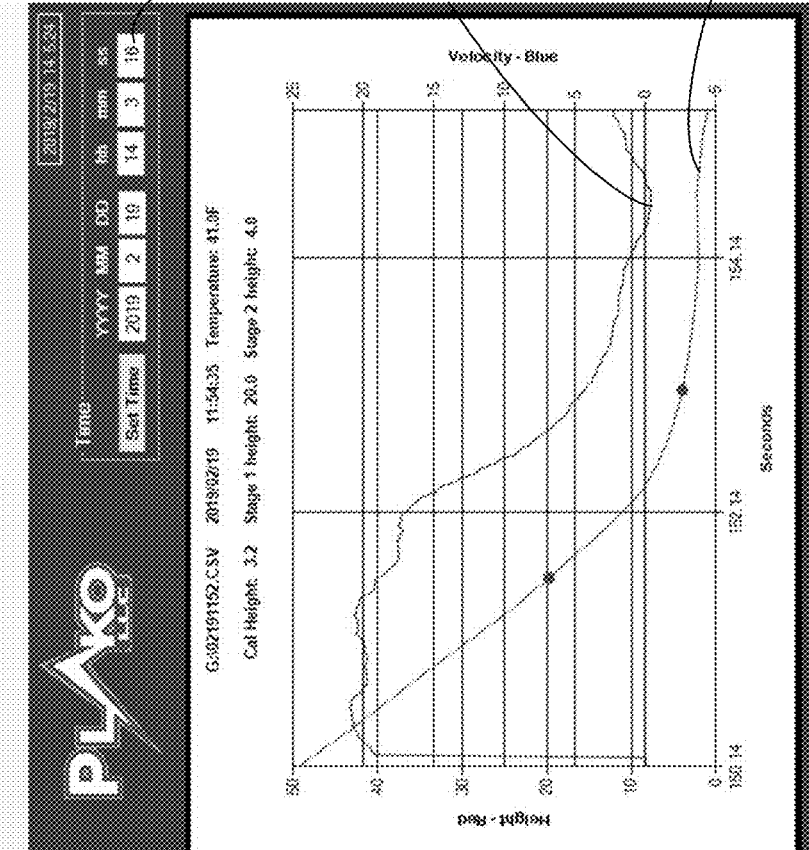
FIG. 16 is a schematic flow diagram of an embodiment the Parachute Landing Assistant graphical user interface.

Embodiments of the Parachute Landing Assistant 100 are comprised of case assembly 101, a power switch or button 202, system indicator device 203, volume control knob 109, wireless digital communication module 211 or a USB port 206, or both a wireless digital communication module 211 and a USB Port 206, an audio jack 204, outside speaker 212, real time clock chip 209, a microcontroller 205, a ground proximity sensor or sensors, an ambient pressure sensor 207, a battery pack 102, and a Parachute Landing Assistant PWB 104.

The ground proximity sensor or sensors is any sensing device that can detect the distance between the sensor and the surface of the ground or the surface of the water on which the parachute load is landing. The ground proximity sensor can be any one or more of the devices in the list comprising LIDAR (LIght Detection and Ranging), LADAR (LAsar Detection and Ranging), Acoustic ranging, barometric pressure, GPS, Radar, IR, Laser, Ultrasonic and Sonar.

The case assembly is comprised of a case 105, a front plate 108, a pair of belt loop apertures 106, a plurality of front plate screws 112, a plurality of belt loop aperture screws 107, a volume control knob 109, an audio port locking nut 110, a power switch locking nut 111, volume control selector rotary dial 113.

The battery pack 102 is comprised of a power storage means such alkaline, lithium ion, rechargeable or non-rechargeable or other types of battery system. The battery pack 102 supplies 5 V DC power to the PWB 104 which in turn can supply power to the other components of the Parachute Landing Assistant. In addition, the battery pack 102 can supply 5 V DC power to components directly. The power source control allows the parachutist to enable or disable the operation of Parachute Landing Assistant. The indicator devices inform the parachutist or pilot as to whether the Parachute Landing Assistant operation is enabled or disabled. The volume control allows the parachutist to set the appropriate volume. The USB port and or wireless digital communication module 211 allows the parachutist or pilot to program settings that control the overall device and download stored files on the micro SD card of previous jumps. The wireless digital communication module 211 includes the Bluetooth standard. The audio jack is comprised of a standard ¼", ⅛", or 3/32" mono audio or stereo audio receptacle or wireless digital communication module that accepts the analogous audio plug or voice modulation. The real time clock time stamps all files saved on the micro SD card for the parachutist's viewing. The microcontroller controls all the other components of the Parachute Landing Assistant. The ground proximity sensor or sensors senses the distance from the ground to the parachutist and can be LIDAR, LADAR, Acoustic, Barometric Pressure, GPS, Radar, IR, Laser, Ultrasonic or Sonar or any combination of these sensors. The ground proximity sensor could be a single sensor or a combined effort of multiple sensors for an all-weather capability. The ambient pressure sensor allows the Parachute Landing Assistant to know where the Parachute Landing Assistant is during the skydive. Once the ambient pressure gauge has determined the parachutist has begun the decent from jump plane, it will sense the pressure change and automatically bring the Parachute Landing Assistant out of the low battery consumption mode. The ambient pressure sensor will also put the Parachute Landing Assistant in a low battery consumption mode if the parachutist forgets to turn the Parachute Landing Assistant off. The ambient pressure sensor will also be used to send a warning to advise the parachutist of upcoming flare tones or voice commands established by the ground proximity sensor. The Parachute Landing Assistant will also have imbedded algorithms that will auto adjust canopy flare points based on changes in decent rate due to changing atmospheric weather conditions or jumper inputs.

The LIDAR sensor 103 is mounted with the battery pack 102. The LIDAR sensor 103 is used to measure the distance from the Parachute Landing Assistant 100 to the ground. The LIDAR sensor 103 provides this measurement to an accuracy of +/−2.5 cm at distance less than 5 m and +/−10 cm at distances greater than 5 m with a typical mean error of +/−1% of distance maximum of forty meters (40 m).

The Parachute Landing Assistant PWB 104 is comprised of a power switch 202, a system indicator device 203, and audio jack 204, a microcontroller 205, a USB port 206, an ambient pressure sensor 207, a micro SD memory card connector 208, real time clock chip 209, and a crystal oscillator 210. The power switch 202 allows the parachutist to enable or disable the operation of Parachute Landing Assistant 100.

The system indicator device 203 is comprised of an LED that informs the parachutist as to whether the Parachute Landing Assistant 100 operation is enabled or disabled and indicates that the unit is charging when plugged into a charging device and when the unit is fully charged. In other embodiments, the system indicator device 203 is another alerting means such as a strobe or indicator. It also indicates when the Parachute landing assistant is recording data and when the device is receiving readings from the ground proximity sensor.

The audio jack 204 is comprised of a standard ¼", ⅛", or 3/32" mono audio or stereo audio receptacle that accepts the analogous audio plug. The audio jack 204 permits a tone or tones to be transmitted from the Parachute Landing Assistant 100 to the headset or helmet of the parachutist to alert the parachutist as to the progress of the parachutist to the ground.

The microcontroller 205 controls all the other components of the Parachute Landing Assistant 100. A control system 1500 is stored in the microcontroller 205. An interface system 1402 is used by the parachutist to input control parameters into the microcontroller 205 and the control system 1500. In particular, the microcontroller 205 receives signals from the ground proximity sensor, interprets those signals, and alerts the parachutist when the parachutist reaches a pre-set distance from the ground. In another embodiment, the microcontroller 205 alerts the parachutist with a series of tones at pre-set distance intervals from the ground. The unit can also determine on its own when the flare process needs to begin and finish based on the parachutist velocity and distance to the ground. The control system 1500 is designed to accommodate different parachute styles and sizes so that the parachutist is given the proper tone based on his equipment.

The control system 1500 is stored on the microcontroller 205 and controls the performance of the Parachute Landing Assistant 100. The control system 1500 reads data from the database 1514 to operate for a specific type of canopy and parachutist. As the descent occurs, the control system 1500 reads data from an ambient pressure sensor 207 to determine the first calculation of the height of the parachutist. Once the control system 1500 determines that the parachutist is within 100 feet of the ground, the control system 1500 begins to use both the ambient pressure sensor 207 and the LIDAR sensor 103.

The ambient pressure sensor 207 puts the Parachute Landing Assistant 100 in a low battery consumption mode on the ground. Once the ambient pressure sensor 207 senses it is in the air, it activates the Parachute Landing Assistant 100 at full capacity at 70 ft. The ambient pressure sensor 207 will also shut the unit back in battery consumption mode off if the parachutist forgets to turn the unit off after landing.

In this operating mode, the control system 1500 first prepares the tone 1501. Next, the control system determines if the descent of the parachutist is correct, too slow or too fast 1502. If the descent is correct, the first stage flare tone set by the Parachutist or from the canopy data base is sounded 1503. As the descent continues and the parachutist reaches the correct height, the second stage flare tone set by the Parachutist or from canopy data base is sounded 1504. This second stage flare tone tells the parachutist to begin the final landing flare. Finally, the parachutist lands 1505.

If the control system 1500 determines that the descent is not correct, the control system 1500 determines if the descent is too slow or too fast 1506. If the control system 1500 determines that the descent is too fast, the control system 1500 adjusts the first stage tone via the pre-programmed control system 1507. As the descent continues, the control system 1500 adjusts the second stage tone via the pre-programmed control system 1508. Finally, the parachutist lands 1509.

If the control system 1500 determines that the descent is too slow, the control system 1500 adjusts the set point lower for first state 1510 and adjusts the first stage tone via the pre-programmed control system 1511. As the descent continues, the control system 1500 adjusts the second stage tone via the pre-programmed control system 1512. Finally, the parachutist lands 1513.

A canopy database 1514 is also stored on the microcontroller 205. This canopy database 1514 contains the parameters required for the control system 1500 to properly operate for a plurality of canopies. The canopy database 1514 parameters comprise the canopy mean average descent rate, canopy surface area, wing loading, for the plurality of canopies.

The interface system 1402 runs on a computer 1401, including a standard laptop computer, and interfaces with the Parachute Landing Assistant 100 via the USB port 206. The interface system 1402 is used to update the canopy database 1514. The interface 1402 is also used to display whether the Parachute Landing Assistant 100 is connected to the computer 1401 via the USB port 206 via the connection indicator 1601. The interface 1402 is also used to display the software version 1602 of the Parachute Landing Assistant 100, the battery voltage 1603, the charging indicator 1604, the battery full indicator 1605, the current altitude 1606, the canopy preset 1607, a start recording height 1608, first stage height 1609, second stage height 1610, default offset distance 1611, first stage Hz tone 1612, second stage Hz tone 1613, and tone filter 1614, the output voltage and historical information about a previous jump such as height 1619 and velocity 1618 which is stored on the microcontroller 205 during a jump but transferred to the micro SD card 208 upon landing. The interface 1402 is also used to input jump specific data for the control system 1500. The interface 1402 also permits reading the current configuration 1615, saving the new configuration 1616 and setting the time 1617.

The LIDAR sensor 103 senses the distance from the ground of the parachutist. The LIDAR sensor 103 can also be comprised of but not limited to one or more of the following technologies: LiDAR, LADAR sensor, an ultrasonic sensor, a laser sensor, a GPS sensor, barometric pressure sensor and an infrared sensor. The ground LIDAR sensor 103 can detect the distance of the parachutist from the ground.

In another embodiment of the Parachute Landing Assistant 100, the method of sensing distance from the ground can be acoustic distance sensing, ambient pressure sensing, laser distance sensing, and GPS sensing.

The microprocessor 205 processes data from the sensors and calculates airspeed deviations, turbulence, and flight mode changes and adjusts flare height accordingly. In addition, the microprocessor 205 logs data in a graphical friendly format to the micro SD card 208 for post-jump analysis. The microprocessor software graphical user interface allows for adjustment of alarm altitudes to correspond to various parachute types/sizes and parachute wing loadings.

In another embodiment, the Parachute Landing Assistant 100 is attached to the fuselage of an airplane, glider, or other aircraft. In landing an aircraft to a smooth landing and to avoid wear on landing gear, the pilot is required to flare the aircraft before touchdown. The flare prior to touchdown allows the plane to reduce speed and gently reach the ground. The Parachute Landing Assistant 100 attached to the fuselage can detect the proximity to the ground and signal the LED indicator light 203 in the cockpit of the aircraft thereby notifying the pilot of the proximity of the aircraft to the ground and the proper length of time to perform the flare, a wireless digital communication module 211 with a speaker 212 or wireless digital communication module 211 and user earbuds or earphones are used.

In another embodiment, the Parachute Landing Assistant 100 can be used to safely land unmanned cargo loads dropped from an aircraft and parachuted to the ground. The Parachute Landing Assistant 100 will provide accurate and reliable altitude, distance, and velocity to the ground for unmanned cargo delivery systems. The Parachute Landing Assistant 100 will interface with the parachute system for the cargo to provide a softer landing for both remotely operated and autonomous cargo parachute systems.

The Parachute Landing Assistant 100 that notifies the parachutist of proper flare timing comprising a battery pack, a power switch, an LED, indicator light, an audio jack, a microcontroller, a control system, interface system, a ground proximity sensor, a real time clock chip, a USB port, a volume control knob, an ambient pressure sensor, a micro SD card connector, and a speaker.

The Parachute Landing Assistant 100 also comprises one or more devices for estimating the parachutist's altitude based upon atmospheric pressure for reading altitudes outside of LIDAR capabilities and the LIDAR for precise measurement within 130 ft of the ground. In one embodiment, the Parachute Landing Assistant 100 comprises a ground proximity sensor that is a LIDAR device.

In one embodiment, the Parachute Landing Assistant 100 comprises a control system designed to receive and act on the ground proximity sensor data. In one embodiment, the Parachute Landing Assistant 100 comprises the control system programmed within the microcontroller can automatically adjust the set flare altitudes based on increased velocity due to a parachutist's proper or even improper toggle inputs or atmospheric conditions.

In one embodiment, the Parachute Landing Assistant 100 comprises different sizes and styles of parachutes are contained within a database such that the control system contains a baseline of mean velocity of each canopy and mean input reaction time of each canopy, wherein the database is loaded on the microcontroller to allow proper flare height selection by the parachutist.

In one embodiment, the Parachute Landing Assistant 100 comprises a microcontroller containing a control system that controls when the unit is in sleep mode and active mode for battery consumption.

In one embodiment, the Parachute Landing Assistant 100 comprises a microcontroller that comprises the control system that determines the height of the unit on the body and makes the appropriate offset to the ground, wherein if the parachutist turns on the unit outside of the LIDAR capability the interface system automatically inserts a preset offset height of the unit.

In one embodiment, the Parachute Landing Assistant 100 comprises the microcontroller comprising the control system that produces audible tones in low to high frequency rages set for specific altitudes, wherein the sequence and frequency of the tones used for a particular altitude notifies the parachutist of the altitude, and wherein the tones can be heard by the parachutist through a speaker, earphones, earbuds or a wireless technology.

What is claimed is:

1. A parachute landing assistant that notifies a parachutist of proper flare timing comprising a battery pack, a power switch, an LED, indicator light, an audio jack, a microcontroller, a control system, interface system, a ground proximity sensor, a real time clock chip, a USB port, a volume control knob, an ambient pressure sensor, a micro SD card connector, and a speaker; one or more devices for estimating a parachutist's altitude based upon atmospheric pressure for reading altitudes outside of LIDAR capabilities and LIDAR for precise measurement within 130 ft of the ground.

2. The parachute landing assistant described in claim 1 comprising the control system designed to receive and act on the ground proximity sensor data.

3. The parachute landing assistant described in claim 1 wherein the control system programmed within the microcontroller can automatically adjust set flare altitudes based on increased velocity due to a parachutist's proper or improper toggle inputs or atmospheric conditions.

4. The parachute landing assistant described in claim 1 wherein different sizes and styles of parachutes are contained within a database such that the control system contains a baseline of mean velocity of each canopy and mean input reaction time of each canopy, wherein a database is loaded on the microcontroller to allow proper flare height selection by a parachutist.

5. The parachute landing assistant described in claim 1 wherein the microcontroller contains the control system that controls when the parachute landing assistant is in sleep mode and active mode for battery consumption.

6. The parachute landing assistant described in claim 1 wherein the microcontroller comprises the control system that determines the height of the parachute landing assistant on a parachute's body and makes an appropriate offset to the ground, wherein if a parachutist turns on the parachute landing assistant outside of LIDAR capability the interface system automatically inserts a preset offset height of the parachute landing assistant.

7. The parachute landing assistant described in claim 1 wherein the microcontroller comprises the control system that produces audible tones in low to high frequency rages set for specific altitudes, wherein a sequence and frequency of tones used for a particular altitude notifies a parachutist of the altitude, and wherein the tones can be heard by the parachutist through a speaker, earphones, earbuds or a wireless technology.

* * * * *